(12) United States Patent
Takahashi

(10) Patent No.: US 9,087,203 B2
(45) Date of Patent: Jul. 21, 2015

(54) INFORMATION PROTECTION DEVICE AND INFORMATION PROTECTION METHOD

(75) Inventor: Tsubasa Takahashi, Tokyo (JP)

(73) Assignee: NEC CORPORATION, Tokyo (JP)

(*) Notice: Subject to any disclaimer, the term of this patent is extended or adjusted under 35 U.S.C. 154(b) by 193 days.

(21) Appl. No.: 13/993,250

(22) PCT Filed: Nov. 25, 2011

(86) PCT No.: PCT/JP2011/077162
§ 371 (c)(1),
(2), (4) Date: Jun. 11, 2013

(87) PCT Pub. No.: WO2012/090628
PCT Pub. Date: Jul. 5, 2012

(65) Prior Publication Data
US 2013/0269038 A1      Oct. 10, 2013

(30) Foreign Application Priority Data
Dec. 27, 2010      (JP) .................................. 2010-290819

(51) Int. Cl.
*H04L 29/06* (2006.01)
*G06F 21/60* (2013.01)
*H04L 9/32* (2006.01)
*G06F 21/62* (2013.01)

(52) U.S. Cl.
CPC ............ *G06F 21/60* (2013.01); *G06F 21/6254* (2013.01); *H04L 9/32* (2013.01); *H04L 2209/42* (2013.01)

(58) Field of Classification Search
None
See application file for complete search history.

(56) References Cited

U.S. PATENT DOCUMENTS 8,031,051 B2 * 10/2011 Tsukamoto .................. 340/10.1
2014/0123323 A1 * 5/2014 Jung et al. ........................ 726/30
2014/0181995 A1 * 6/2014 Smith et al. ..................... 726/28

OTHER PUBLICATIONS

NTT Docomo Inc., "Heisei 21 Nendo Joho Daikokai Project (Model Service no Kaihatsu to Jissho) Jigyo Hokokusho", [online], Dec. 1, 2010, pp. 43-68, Retrieved from the Internet: <URL:http://www.meti.go.jp/policy/it_policy/daikoukai/igvp/index/h22_report/main/model01.pdf>.

(Continued)

*Primary Examiner* — Christopher Revak
(74) *Attorney, Agent, or Firm* — Sughrue Mion, PLLC

(57) ABSTRACT

When position information is added in a real-time fashion, anonymity of movement trajectories is ensured and the degree of abstraction of positioning data included in the position information is prevented from becoming too high. A group of anonymous information with a second positioning time preceding a first positioning time is partitioned into two or more groups so that the anonymous information with the first positioning time satisfies a predetermined anonymity metric and so that a degree of abstraction of the abstracted positioning data in the anonymous information becomes lower than a predetermined standard value, anonymous information including positioning data with the first positioning time abstracted by the partitioned groups is generated, and the generated anonymous information is stored in an anonymous information storage unit in association with the anonymous information with the second positioning time.

11 Claims, 16 Drawing Sheets

(56) References Cited

OTHER PUBLICATIONS

R. Yarovoy et al., "Anonymizing Moving Objects: How to Hide a MOB in a Crowd?", Proceedings of the 12th International Conference on Extending Database Technology (EDBT '09), ACM, 2009, pp. 72-83, Retrieved from the Internet: <URL: http://dl.acm.org/citation.cfm?id=1516370>.

Tsubasa Takahashi et al., "Real-time k-anonymization for Trajectory Stream", Deim Forum 2011 Proceedings, Jul. 17, 2011, C5-1, Retrieved from the Internet: <URL: http://db-event.jpn.org/deim2011/proceedings/pdf/c5-1.pdf>.

Osman Abul et al., "Never Walk Alone: Uncertainty for Anonymity in Moving Objects Databases" Computer Engineering Department, TOBB University, pp. 1-10, Ankara, Turkey.

* cited by examiner

| ANONYMOUS INFORMATION ID | PARENT ANONYMOUS INFORMATION ID | MOVEMENT TRAJECTORY ID | POSITIONING TIME | AREA INFORMATION |
|---|---|---|---|---|
| T001 | — | A | t0 | INFORMATION IDENTIFYING AREA AT t0 OF ANONYMOUS INFORMATION T001 |
| T001 | — | B | t0 | INFORMATION IDENTIFYING AREA AT t0 OF ANONYMOUS INFORMATION T001 |
| T001 | — | C | t0 | INFORMATION IDENTIFYING AREA AT t0 OF ANONYMOUS INFORMATION T001 |
| T001 | — | D | t0 | INFORMATION IDENTIFYING AREA AT t0 OF ANONYMOUS INFORMATION T001 |
| ... | ... | ... | ... | ... |

FIG. 4

| ANONYMOUS INFORMATION ID | PARENT ANONYMOUS INFORMATION ID | MOVEMENT TRAJECTORY ID | POSITIONING TIME | AREA INFORMATION |
|---|---|---|---|---|
| T001 | — | A | t0 | INFORMATION IDENTIFYING AREA AT t0 OF ANONYMOUS INFORMATION T001 |
| T001 | — | B | t0 | INFORMATION IDENTIFYING AREA AT t0 OF ANONYMOUS INFORMATION T001 |
| T001 | — | C | t0 | INFORMATION IDENTIFYING AREA AT t0 OF ANONYMOUS INFORMATION T001 |
| T001 | — | D | t0 | INFORMATION IDENTIFYING AREA AT t0 OF ANONYMOUS INFORMATION T001 |
| T001 | — | E | t0 | INFORMATION IDENTIFYING AREA AT t0 OF ANONYMOUS INFORMATION T001 |
| ⋮ | ⋮ | ⋮ | ⋮ | ⋮ |
| T002 | T001 | A | t3 | INFORMATION IDENTIFYING AREA AT t2 OF ANONYMOUS INFORMATION T002 |
| T002 | T001 | B | t3 | INFORMATION IDENTIFYING AREA AT t2 OF ANONYMOUS INFORMATION T002 |
| T002 | T001 | C | t3 | INFORMATION IDENTIFYING AREA AT t2 OF ANONYMOUS INFORMATION T002 |
| T003 | T001 | D | t3 | INFORMATION IDENTIFYING AREA AT t2 OF ANONYMOUS INFORMATION T003 |
| T003 | T001 | E | t3 | INFORMATION IDENTIFYING AREA AT t2 OF ANONYMOUS INFORMATION T003 |
| ⋮ | ⋮ | ⋮ | ⋮ | ⋮ |
| T005 | T003 | D | t6 | INFORMATION IDENTIFYING AREA AT t6 OF ANONYMOUS INFORMATION T005 |
| T005 | T003 | E | t6 | INFORMATION IDENTIFYING AREA AT t6 OF ANONYMOUS INFORMATION T005 |
| T005 | T004 | F | t6 | INFORMATION IDENTIFYING AREA AT t6 OF ANONYMOUS INFORMATION T005 |
| T005 | T004 | G | t6 | INFORMATION IDENTIFYING AREA AT t6 OF ANONYMOUS INFORMATION T005 |
| T005 | T004 | H | t6 | INFORMATION IDENTIFYING AREA AT t6 OF ANONYMOUS INFORMATION T005 |
| T006 | — | X | t7 | INFORMATION IDENTIFYING AREA AT t7 OF ANONYMOUS INFORMATION T006 |
| T006 | — | Y | t7 | INFORMATION IDENTIFYING AREA AT t7 OF ANONYMOUS INFORMATION T006 |
| T007 | — | Z | t7 | INFORMATION IDENTIFYING AREA AT t7 OF ANONYMOUS INFORMATION T007 |
| T007 | — | W | t7 | INFORMATION IDENTIFYING AREA AT t7 OF ANONYMOUS INFORMATION T007 |
| T007 | — | V | t7 | INFORMATION IDENTIFYING AREA AT t7 OF ANONYMOUS INFORMATION T007 |
| ⋮ | ⋮ | ⋮ | ⋮ | ⋮ |

FIG. 9

| NAME | GENDER | OCCUPATION | AGE | ILLNESS |
|---|---|---|---|---|
| Alice | MALE | SE | 24 | INFLUENZA |
| Bob | MALE | PROGRAMMER | 26 | CANCER |
| Charlie | MALE | ARTIST | 29 | TUBERCULOSIS |
| David | FEMALE | DANCER | 23 | INFLUENZA |
| Edger | MALE | SE | 39 | CANCER |
| Franc | FEMALE | PROGRAMMER | 38 | LEUKEMIA |
| George | FEMALE | NURSE | 30 | INFLUENZA |
| Hung | FEMALE | DOCTOR | 32 | ATHLETE'S FOOT |

FIG. 13

| TWO ANONYMIZATION | GENDER | OCCUPATION | AGE | ILLNESS |
|---|---|---|---|---|
| TWO PEOPLE { | MALE | ENGINEER | 20TH | INFLUENZA |
| | MALE | ENGINEER | 20TH | CANCER |
| TWO PEOPLE { | MALE | ARTIST | 20TH | TUBERCULOSIS |
| | FEMALE | ARTIST | 20TH | INFLUENZA |
| TWO PEOPLE { | MALE | ENGINEER | 30TH | CANCER |
| | FEMALE | ENGINEER | 30TH | LEUKEMIA |
| TWO PEOPLE { | FEMALE | MEDICAL PROFESSIONAL | 30TH | INFLUENZA |
| | FEMALE | MEDICAL PROFESSIONAL | 30TH | ATHLETE'S FOOT |

FIG. 14 k=4
WHERE THE USERS ARE LOCATED
IS UNCLEAR

INFORMATION PROTECTION DEVICE AND INFORMATION PROTECTION METHOD

This application is a National Stage of International Application No. PCT/JP2011/077162 filed Nov. 25, 2011, claiming priority based on Japanese Patent Application No. 2010-290819 filed Dec. 27, 2010, the contents of all of which are incorporated herein by reference in their entirety.

BACKGROUND

The present invention relates to an information protection device and an information protection method.

In recent years, the use of position information including positioning data acquired by a GPS (Global Positioning System) or wireless LAN (Local Area Network) installed in a portable terminal or an automobile has increased for a variety of applications. Furthermore, the number of services for periodically acquiring position information and recording the movement trajectory or action history of the users of portable terminals or automobiles has been growing.

In addition to the information that can identify the user, such as one's home, place of employment, and school, the position information may include information that the user does not want to be known to others, such as a hobby or hospital. Therefore, the position information has a high degree of privacy. Further, the movement trajectory, which is the time-series information of position information, may also represent the route to a sensitive location with a high degree of individual privacy and the presence or absence at such a location, and can identify the user at a level higher than independent position information. In addition, where the movement trajectory is used in a real-time fashion by a service provider or data analyst, the user is always under a threat of being tracked and monitored. Therefore, the movement trajectory is privacy information with a very high degree of privacy. Accordingly, when such privacy information is provided to the service provider or data analyst, anonymity should be ensured by anonymization.

The anonymization, as referred to herein, is the processing by which privacy information is processed so the user could not be identified. A metric indicating the degree to which the user cannot be identified is called anonymity metric. Thus, k-anonymity is well known as the anonymity metric which is presently used. Information which is included in the privacy information and is not an identifier that can uniquely identify the user, but can identify the user when background information or the like is taken into account, is called quasi-identifier (indirect identifier). Further, information that the user does not want to be known to others is called sensitive information. The k-anonymity is the metric that indicates the presence of k or more types of sensitive information having the same quasi-identifier by anonymization of the quasi-identifier. By ensuring k-anonymity, it is possible to reduce the possibility of identifying the user to 1/k or less, thereby making it difficult to identify the user.

A patient's medical record such as shown in FIG. 13 will be considered below by way of example. The medical record shown in FIG. 13 includes the name, gender, occupation, and age of the patient together with the medical condition. The medical condition is sensitive information with a high degree of privacy. The name is an identifier uniquely identifying the person, and the gender, occupation, and age are quasi-identifiers that can identify the person. For example, even if the patient's name is unknown, the patient can be estimated on the basis of a combination of occupation and age. In other words, even in a state in which the patient's name is hidden, a person knowing the patient's occupation and age can know the medical condition of the patient. In order to avoid this, the level of abstraction of occupation and age can be increased, as shown in FIG. 14. FIG. 14 presents anonymous information obtained by anonymization of the medical record shown in FIG. 13, such as to ensure the k anonymity of k=2. In the anonymous information shown in FIG. 14, even if the occupation and age are known, two or more medical conditions are present for all combinations of occupation and age. As a result, even a person knowing the occupation and age of a patient, cannot accurately estimate the patient's medical condition. Further, l-diversity, t-closeness, and m-invariance are known in addition to k-anonymity as metrics of anonymity.

Non-Patent Document 1: O. Abul, F. Bonchi, M. Nanni "Never Walk Alone: Uncertainty for Anonymity in Moving Objects Databases", Proceedings of the 24th International Conference on Data Engineering, IEEE, April 2008, p. 376-385.

However, position information and movement trajectory are different in nature from the above-described information. Positioning data of position information point to a specific location. In some cases, the positioning data indicate a location with a high degree of privacy for everyone, but privacy of specific positioning data generally differs depending on the user linked thereto. Even if the positioning data indicate the location, such as a hospital or home, the meaning of the location is difficult to estimate by merely linking the user and the positioning data. Meanwhile, information such as the staying time duration and the length thereof can be obtained from continuous positioning data such as a movement trajectory. From such information, it is possible to estimate the meaning of the location indicated by the positioning data. Then, it is possible to identify the user on the basis of the estimated information. Therefore, the positioning data constituting the movement trajectory can be considered as a quasi-identifier and also as sensitive information.

FIG. 15 shows the information obtained by subjecting position information to k-anonymization. Each point represents positioning data of position information, and the ellipse is the anonymous information obtained by anonymization of position information by abstraction of positioning data of position information enclosed in the ellipse. In FIG. 15, k-anonymity with k=4 is ensured and accurate position of the user is unknown.

In addition to the above-described specific feature of position information, the movement trajectory has a specific feature of representing the actual conditions of the user's life. By linking the user with the movement trajectory, it is possible to reveal all destinations and staying locations including the location with a high degree of privacy for the user. There is also a risk of the user's movement being monitored or tracked. Therefore, the privacy of movement trajectory is much higher than that of the independent position information or a combination of a plurality of types of simple position information. Furthermore, in some cases the user can be identified only by revealing several types of positioning data of position information in the movement trajectory. For example, information such own home, place of employment, and the nearest station are often known to friends and colleagues. Therefore, where the positioning data on those locations are included in the movement trajectory, the user linked to the movement trajectory can be identified and privacy information on other locations such as hospital and locations clearly indicating preferences can be revealed.

Accordingly, the anonymization of the movement trajectory is performed to make it difficult to link the user with the movement trajectory. In order to ensure k-anonymity, it is necessary to generate the movement trajectory that is anonymized so as to include k or more movement trajectories. FIG. 16 shows an example of movement trajectory anonymization. In FIG. 16, a tubular movement trajectory is generated such that includes four movement trajectories. The information in which the correspondence of the movement trajectory and the user is thus obscured is called anonymous information. The objective movement trajectory is included in the anonymous information in the entire zone from the start point to the end point of the movement trajectory. Therefore, position information within a specific period of time in the anonymous information also satisfies the k-anonymity at all times. In other words, the anonymous information shown in FIG. 16 satisfies the k-anonymity (k=4).

Non-Patent Document 1 discloses an example of anonymization technique using anonymous information. Non-Patent Document 1 describes the technique for anonymization of accumulated movement trajectories and suggests the anonymization technique which uses the anonymity metric of (k, δ)-anonymity and by which static movement trajectories accumulated in the database are generalized into a tubular shape. With such a technique, the anonymization is performed by grouping and abstracting data with clear start points and end points of movement trajectories for which distances between the movement trajectories are close to each other. Ensuring the k-anonymity with respect to static movement trajectories means ensuring that k or more movement trajectories consistently present between the start point and the end point are included in the same group (anonymous information). As a result, even if there is one known staying point in the user's movement trajectory, the movement trajectory itself cannot be identified. The assembly of movement trajectories is abstracted into a tubular shape in a three-dimensional space of latitude, longitude, and time at which they are measured, and the abstracted assembly is outputted as anonymous information.

The anonymization technique shown in FIG. 16 is effective for anonymizing movement trajectories within a predetermined period, but is not necessarily effective for real-time anonymization of movement trajectories such that position information is added moment by moment. In such an environment, the movement trajectory extends (enlarges) on a time axis as the unknown position information arrives periodically. Therefore, in order to use the movement trajectory in a real-time fashion, while ensuring anonymity, it is necessary to perform the real-time anonymization with respect to the increments of the movement trajectory. When such anonymization is performed, the anonymization with respect to the increments should be performed after the result of the already performed anonymization has been taken into account. This is done to make it difficult to establish the correspondence between the user and the movement trajectory that depends on a combination of a plurality of pieces of position information, in the same manner as in the anonymization of static movement trajectories. With the anonymization method illustrated by FIG. 16, the anonymization is performed with respect to accumulated movement trajectories, and no anonymization with respect to the increments of the movement trajectory is assumed. In particular, the anonymization method illustrated by FIG. 16 is based on a macroscopic approach according to which the anonymization is performed once so as to satisfy the anonymity requirement in the entire path between the start point and the end point, and is not intended for processing the local position information such as increments of movement trajectory.

Therefore, where the anonymization method illustrated by FIG. 16 is applied to newly arrived increments, it is assumed that the anonymization is performed with respect to a short path for which the increment data and data preceding thereto are captured as the end point and the start point, respectively. In such a case, in order to ensure k-anonymity, it is necessary to configure the anonymous information by using the previously anonymized anonymous information and at least k or more identical movement trajectories.

However, every user acts and moves in his or her individual manner. Therefore, it is unlikely that the users with adjacent movement trajectories at some point in the past will continue following the adjacent trajectories in the same manner in the future. Therefore, it can be assumed that in the anonymization method illustrated by FIG. 16, the geographical similarity between movement trajectories forming anonymous information decreases and the degree of abstraction of anonymous information gradually increases with the passage of time. In other words, where the anonymous information is configured of the same combination of movement trajectories at all times, the positioning data of position information included in the movement trajectories can become too abstract and meaningless information can be obtained. Furthermore, the anonymity cannot be guaranteed in the case where the anonymization is performed independently with respect to movement trajectories in different time intervals, without taking into consideration the movement trajectories that have been anonymized in the past.

SUMMARY

The present invention has been created with the foregoing in view and it is an object thereof to ensure the anonymity of movement trajectory and prevent the degree of abstraction of positioning data included in position information from becoming too high when the position information is added in a real-time fashion.

A information protection device according to one aspect of the present invention includes: a movement trajectory storage unit configured to store movement trajectories which are history of position information including a user identifier, positioning data indicating a position of a user, and positioning time; an anonymous information storage unit configured to store positioning data obtained by grouping and abstracting positioning data of position information on a plurality of users so that position information with the same positioning time satisfies a predetermined anonymity metric, the positioning data being stored as anonymous information in association with identifiers of movement trajectories of the plurality of users and the positioning time; an increment abstraction unit configured to refer to the movement trajectory storage unit and, with respect to the position information on the plurality of users including the same positioning time after the positioning time of the anonymous information stored in the anonymous information storage unit, generate anonymous information by grouping and abstracting positioning data in the same group with the anonymous information stored in the anonymous information storage unit and store the generated anonymous information in the anonymous information storage unit in association with the anonymous information stored in the anonymous information storage unit; and a partitioning unit configured to partition a group of the anonymous information with a second positioning time preceding a first positioning time into two or more groups so that the anonymous information with the first positioning time satisfies the predetermined anonymity metric and so that a degree of abstraction of the abstracted positioning data in the anonymous information becomes lower than a predetermined standard value, generate anonymous information including positioning data with the first positioning time abstracted by the partitioned groups, and store the generated anonymous information in the anonymous information storage unit in association with the anonymous information with the second positioning time.

In the present invention, the term "unit" does not simply describes physical means. Thus, the case in which the functions of the "unit" are implemented by software is also included. Further, the functions of one "unit" or device may be implemented by two or more physical means or devices, or the functions of two or more "units" or devices may be implemented by one physical means or device.

In accordance with the present invention, the anonymity of movement trajectory can be ensured and the degree of abstraction of positioning data included in position information can be prevented from becoming too high when the position information is added in a real-time fashion.

DESCRIPTION OF DRAWINGS

FIG. 4 illustrates a configuration example of anonymous information.

FIG. 9 illustrates an example of anonymous information.

FIG. 13 shows an example of medical records of patients.

FIG. 14 shows an example of anonymization of the medical records of patients.

DETAILED DESCRIPTION

Embodiments of the present invention will be explained below with reference to the appended drawings.

First Embodiment

Figure 1:
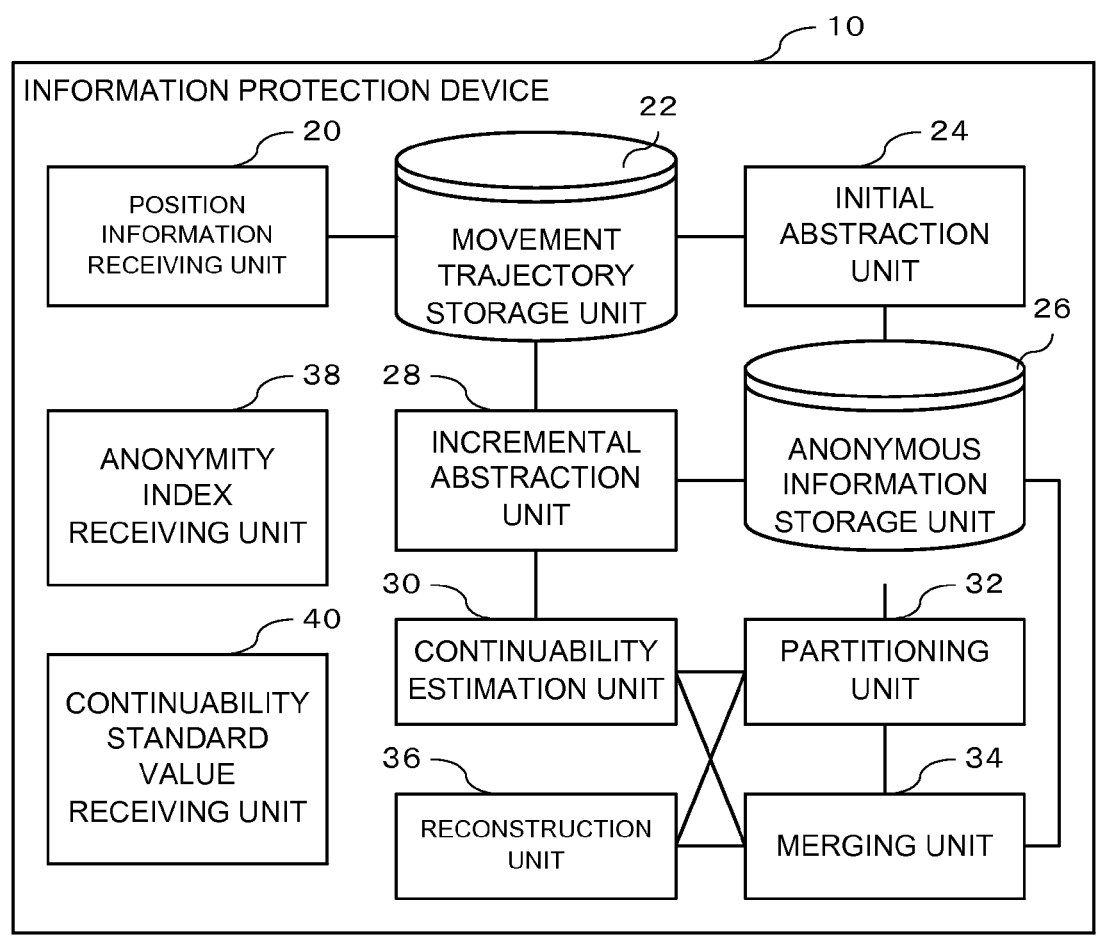
FIG. 1 illustrates the configuration of the information protection device which is the first embodiment of the present invention.

The first embodiment of the present invention is explained below. FIG. 1 illustrates the configuration of the information protection device which is the first embodiment of the present invention.

An information protection device 10 includes a position information receiving unit 20, a movement trajectory storage unit 22, an initial abstraction unit 24, an anonymous information storage unit 26, an incremental abstraction unit 28, a continuability estimation unit 30, a partitioning unit 32, a merging unit 34, a reconstruction unit 36, an anonymity metric receiving unit 38, and a continuability standard value receiving unit 40. The information protection device 10 is, for example, an information processing device such as a server and includes a CPU, a memory, and a storage device. The movement trajectory storage unit 22 and the anonymous information storage unit 26 can be implemented by using storage areas on the memory or storage device. Further, the position information receiving unit 20, initial abstraction unit 24, incremental abstraction unit 28, continuability estimation unit 30, partitioning unit 32, merging unit 34, reconstruction unit 36, anonymity metric receiving unit 38, and continuability standard value receiving unit 40 can be implemented by executing the programs stored in the memory with the CPU.

The information protection device 10 implements real-time anonymization with respect to movement trajectories which are the history of position information sent from a plurality of users and outputs the obtained anonymous information. The concept of anonymization in the information protection device 10 is explained below prior to providing the detailed explanation of each unit of the information protection device 10.

Figure 2:
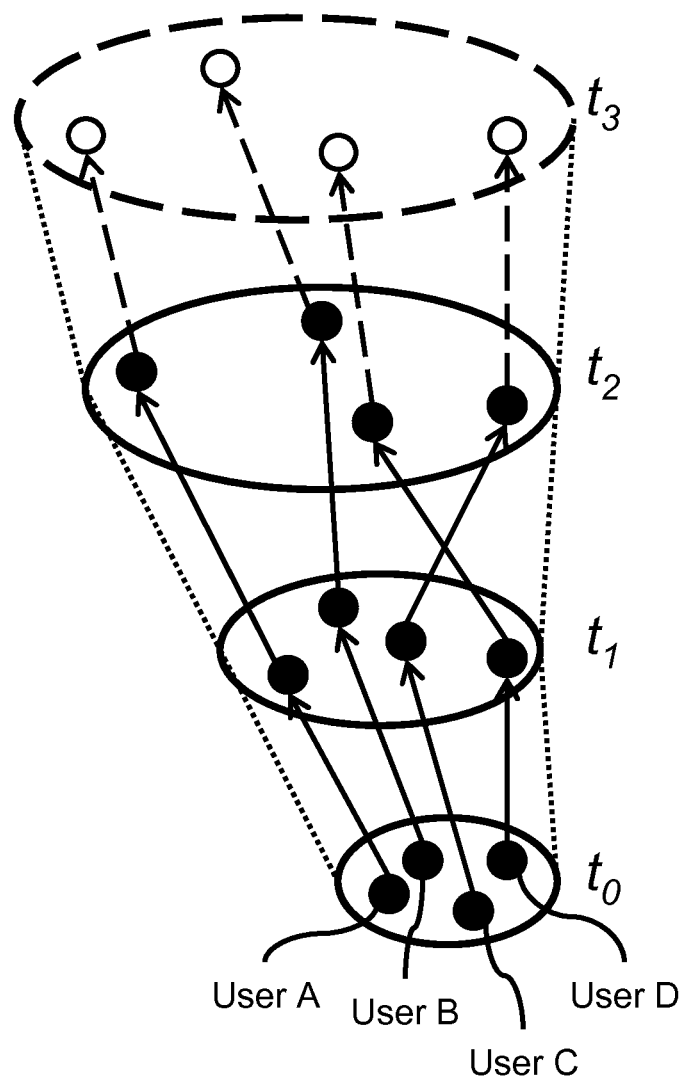
FIG. 2 illustrates an anonymization example of a movement trajectory.

FIG. 2 illustrates an anonymization example of a movement trajectory. Here, the movement trajectory is time-series information of position information on each user, which is constituted by a plurality of pieces of position information. Each position information includes positioning data indicating the user's position. Therefore, where the user is known to be at a certain location at a certain day and time, it is possible that the observer of the movement trajectory would be capable of determining where the user was at the other time. Accordingly, the information protection device 10 ensures, in a real-time fashion, the k-anonymity of the movement trajectory and prevents the observer from knowing the position information or movement trajectory unknown thereto.

In the example shown in FIG. 2, the movement trajectories of users A to D are anonymized (abstracted) so as to satisfy the k-anonymity (k=4). Each spot in FIG. 2 corresponds to position information on each user at a certain point in time and represents the position indicated by the positioning data of the position information. An arrow connecting the spots represents the movement of the user from the position of the start point to the position of the end point of the arrow, and the chain determined by the connection relationship of the spots and arrows represents the movement trajectory of the user. The ellipses in the figure represent ranges (areas) including the positions indicated by a plurality of pieces of position information. A spot included in the ellipse demonstrates that the user with the position information indicating this spot stayed inside the area.

In the example shown in FIG. 2, at a point of time t0, the position information on the four users is included in the ellipse. This indicates that the position information on the four users at the point of time t0 is anonymized by abstraction in the area represented by the ellipse by grouping (clustering) the positioning data. As shown in FIG. 2, the position information on the four users is anonymized in the form of abstracting in the area satisfying the k-anonymity (k=4). Likewise, the position information on each user at a point of time t1 also satisfies the k-anonymity.

In this case, the movement trajectory within the [t0, t1] interval satisfies the k-anonymity because the anonymous information at the point of time t1 is constituted by selecting k or more users from the users constituting the anonymous information at the point of time t0. In FIG. 2, two ellipses and dot lines drawn therebetween represent the anonymization performed so that the interval between the ellipses satisfies the k-anonymity.

The information protection device 10 can generate the anonymous information in a real-time fashion. For example, in the case in which position information at a point of time t3 is added in a state in which the anonymous information preceding a point of time t2 has already been generated, the information protection device 10 generates the anonymous information from the position information at the point of time t3 upon taking into consideration the anonymous information preceding the point of time t2.

In FIG. 2, the position information at the point of time t3 is represented by an empty (white) dot. The white dot represents the recent position information, among the position information on the users. Other spots (referred to hereinbelow as black spots) represent the position information that has been received before the white spots and has already been used for constituting the anonymous information. The anonymization of the white spots can be performed in the same group with the anonymous information including the black spots of the same users. Where the anonymization is thus performed, the anonymization with respect to the new increment data (white spots) on the movement trajectory can be performed to match the arrival of the increment data in a real-time fashion, while satisfying the k-anonymity of the movement trajectory.

However, where the anonymous information is configured by using the same combination of movement trajectories at all times, the area in the anonymous information will apparently expand in a gradual manner. In other words, the degree of abstraction of positioning data can become excessive. Where the degree of abstraction of positioning data thus becomes excessive, although the anonymity is guaranteed, the position information and movement trajectory with a large loss of information can be generated and anonymous information with a low utility value can be obtained.

Figure 3:
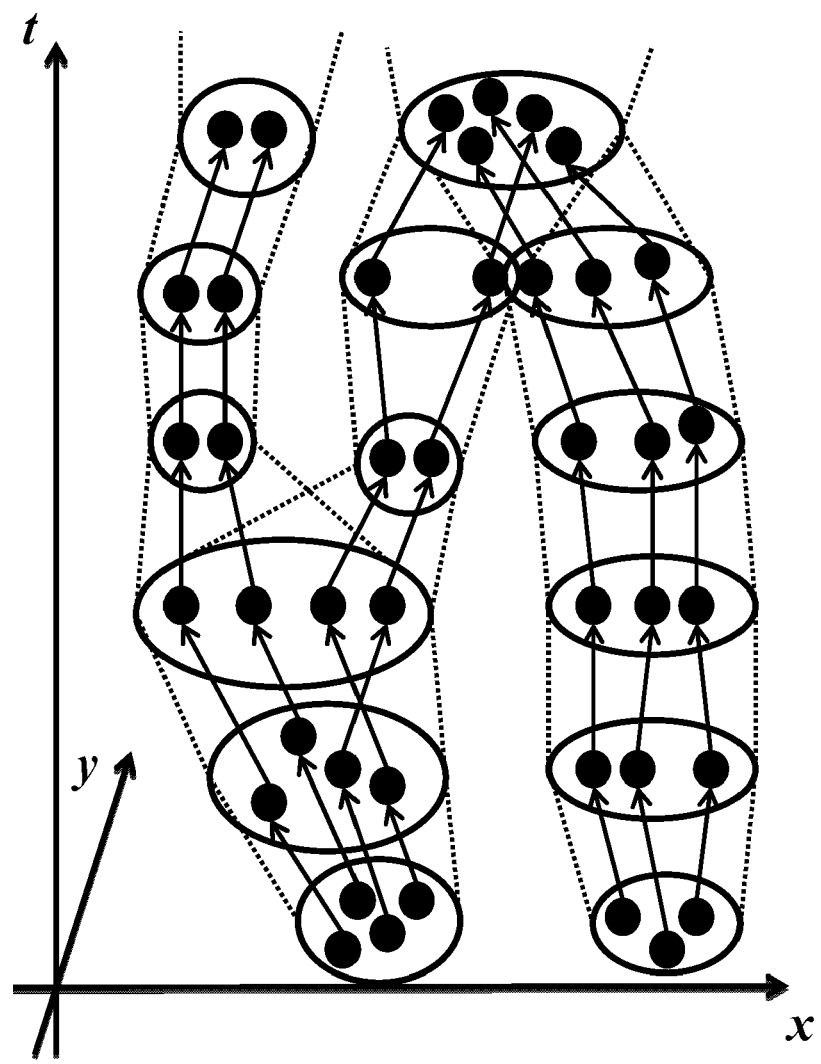
FIG. 3 illustrates an example of dynamic reconstruction of anonymous information.

Accordingly, the information protection device 10 prevents the degree of abstraction of positioning data from becoming too high by dynamically reconstructing the anonymous information by dividing and merging the anonymous information. FIG. 3 illustrates an example of dynamic reconstruction of anonymous information in the information protection device 10. In the example shown in FIG. 3, the anonymous information on the left side is partitioned in two at an intermediate stage. The anonymous information on the right side is merged with separate anonymous information at an intermediate stage. Where the anonymous information is thus partitioned or merged, the degree of abstraction of positioning data is prevented from becoming higher than that before the anonymous information is partitioned or merged.

Further, the degree of abstraction of positioning data indicates the amount of anonymous information and is determined, for example, from the size of the area or density of position information included in the area. For example, an area which is too wide has little utility value and it can be said that the amount of anonymous information is small.

Each unit of the information protection device 10 will be explained below in greater detail with reference to FIG. 1.

The position information receiving unit 20 is communicatively connected by a network to a plurality of user terminals. The user terminal is an information processing device having a positioning function implemented by GPS, wireless LAN, or the like. For example, the user terminal is a portable terminal or a car navigation device. In such user terminal, the terminal position is periodically determined and position information obtained by adding a positioning time or user ID to the determined positioning data including information such as latitude, longitude, and altitude is sent to the position information protection device 10, for example, via the wireless network of a cellular phone. The position information receiving unit 20 receives the position information from each user terminal that has thus been periodically sent and stores the received position information in the movement trajectory storage unit 22.

The user ID is information that can identify the user. For example, the user name, user ID, or terminal ID can be used. The positioning data are not limited to the detailed information represented by the latitude, longitude, and altitude and may be, for example, the area information representing a predetermined range such as represented by a region mesh code established by the Ministry of Internal Affairs and Communications of Japan.

The movement trajectory storage unit 22 records for each user the user position information continuously received by the position information receiving unit 20. In other words, the movement trajectory storage unit 22 stores the movement trajectories which are the history of position information. In the movement trajectory storage unit 22, the position information may be stored along the time series for each user or the position information may be stored regardless of any specific order.

The initial abstraction unit 24 generates anonymous information by grouping and abstracting the positioning data of position information on a plurality of users with the same positioning time with respect to the position information on the users for which the anonymous information has not yet been created, and stores the generated anonymous information in the anonymous information storage unit 26. When the positioning data are grouped, it is not necessary that the positioning time be exactly the same, and the positioning time belonging to the same time duration of a certain width can be determined as the same positioning time.

FIG. 4 illustrates an example of anonymous information stored in the anonymous information storage unit 26. As shown in FIG. 4, the anonymous information includes anonymous information ID, parent anonymous information ID, movement trajectory ID, positioning time, and area information.

The anonymous information ID is the identifier of anonymous information and indicates the group of position information generated by abstraction of positioning data. For example, one anonymous information ID is assigned to a series of anonymous information shown in FIG. 2. Where the group of position information in the anonymous information is changed by reconstruction processing such as partitioning or merging, a new anonymous information ID is assigned to the newly generated anonymous information. In this case, the anonymous information ID before the reconstruction is set as a parent anonymous information ID to link the anonymous information before the reconstruction with the anonymous information after the reconstruction. In other words, the parent anonymous information ID is the information indicating the parent-child relationship of anonymous information.

The movement trajectory ID is the identifier of movement trajectories of a plurality of users included in the anonymous information. For example, the anonymous information shown in FIG. 2 includes the movement trajectories of four people, namely, the users A to D. In this case, the information indicating the user for which the anonymization of the movement trajectory has produced the anonymous information is set as the movement trajectory ID. For example, as shown in FIG. 4, A to D are set as movement trajectory IDs relating to movement trajectories of the four users A to D. The movement trajectory ID is used to check whether the anonymous information relating to the movement trajectory of a certain user is already present. For example, the user ID included in the position information can be set in the movement trajectory ID. In this case, by checking whether or not the anonymous information for which the user ID included in the position information has been set as the movement trajectory ID is present, it is possible to check whether the anonymous information relating to a certain user has already been created. Further, the movement trajectory ID may be an identifier that can identify the relationship with the user ID, rather than the user ID itself. It is not necessary that the relationship with the user ID be identifiable only by the movement trajectory ID. For example, information indicating the correspondence relationship between the user ID and movement trajectory ID may be stored in the anonymous information storage unit 26 separately from the anonymous information.

A positioning time taken as a reference time when the positioning data are grouped is set as the positioning time. The positioning time in the anonymous information can be information representing a time duration of a certain width, rather than a specific time.

The area information is information for identifying the area enclosing the positions indicated by the positioning data of position information on a plurality of users. For example, where the area in the position information has an elliptical shape, as shown in FIG. 2, the latitude and longitude of the central point, and the long and short axes of the ellipse can be set in the area information. The area shape is not limited to the ellipse, and any identifiable shape can be used.

Returning to FIG. 1, the increment abstraction unit 28 extracts the position information on the user for which the anonymous information has already been created from the movement trajectory storage unit 22 and anonymizes the position information by grouping and abstracting the positioning data. In this case, the increment abstraction unit 28 generates anonymous information by grouping and abstracting the positioning data in the same group with the anonymous information stored in the anonymous information storage unit 26. As a result, where the anonymous information that has been heretofore stored in the anonymous information storage unit 26 satisfies the k-anonymity, the newly generated anonymous information will also satisfy the k-anonymity.

The continuability estimation unit 30 estimates the continuability of the anonymous information generated by abstracting the positioning data of position information in the increment abstraction unit 28. The continuability, as referred to herein, is a metric indicating the degree to which the anonymous information can be continued by the same combination of movement trajectories, without partitioning or merging the movement trajectories, and this metric can be determined by the amount of anonymous information. Specific examples of the metric of continuality include the area size and density of anonymous information. The density of anonymous information can be determined, for example, by dividing the number of movement trajectories constituting the anonymous information by the area size.

The partitioning unit 32 partitions the anonymous information generated by abstraction of positioning data in the increment abstraction unit 28 into a plurality of pieces of anonymous information so as to reduce the degree of abstraction. The partitioning unit 32 performs the partitioning so that the number of movement trajectories constituting the anonymous information becomes equal to or greater than k, that is, so that the k-anonymity is satisfied even after the partitioning. The anonymous information after the partitioning is stored in the anonymous information storage unit 26 in association with the anonymous information before the partitioning. In other words, a new anonymous information ID that is different from that of the anonymous information before the partitioning is assigned to the anonymous information after the partitioning, and the anonymous information ID of the anonymous information before the partitioning is set to the parent anonymous information ID.

The combining unit 34 merges the plurality of pieces of anonymous information generated by the increment abstraction unit 28 or the partitioning unit 32 into single anonymous information so that the degree of abstraction is reduced. The anonymous information after the combining is stored in the anonymous information storage unit 26 in association with the anonymous information before the combining. In other words, a new anonymous information ID that is different from that of the anonymous information before the combining is assigned to the anonymous information after the combining, and the anonymous information ID of the anonymous information before the combining is set to the parent anonymous information ID.

Where the anonymous information generated by partitioning is associated with the anonymous information before the partitioning, when the anonymized movement trajectory including the anonymous information before and after the partitioning does not satisfy the k-anonymity, the reconstruction unit 36 cancels the correspondence relationship between the anonymous information before and after the partitioning. In other words, the anonymous information after the partitioning is assigned with an anonymous information ID different from that of the anonymous information before the partitioning and a parent anonymous information ID is initialized. Such a reconstruction can be necessary when the merged anonymous information is partitioned again. For example, where two types of anonymous information configured of k movement trajectories are merged and then partitioned, the k-anonymity of movement trajectory is ensured only when the partitioning is performed into the anonymous information parts configured by the movement trajectories same as those before the merging. In other cases, the k-anonymity is not ensured. The reconstruction of the anonymous information with the reconstruction unit 36 is performed during the partitioning processing in which the k-anonymity is thus not ensured.

The anonymity metric receiving unit 38 receives from the user the anonymity metric (for example, "k" in k-anonymity) serving as a standard when anonymizing the movement trajectories in the information protection device 10 and stores the received anonymity metric.

The continuability standard value receiving unit 40 receives from the user a standard value to be used when determining the continuability of anonymous information and stores the received standard value. As mentioned hereinabove, for example, a value indicating the degree of abstraction of positioning data in the anonymous information can be taken as the standard value.

Figure 5:
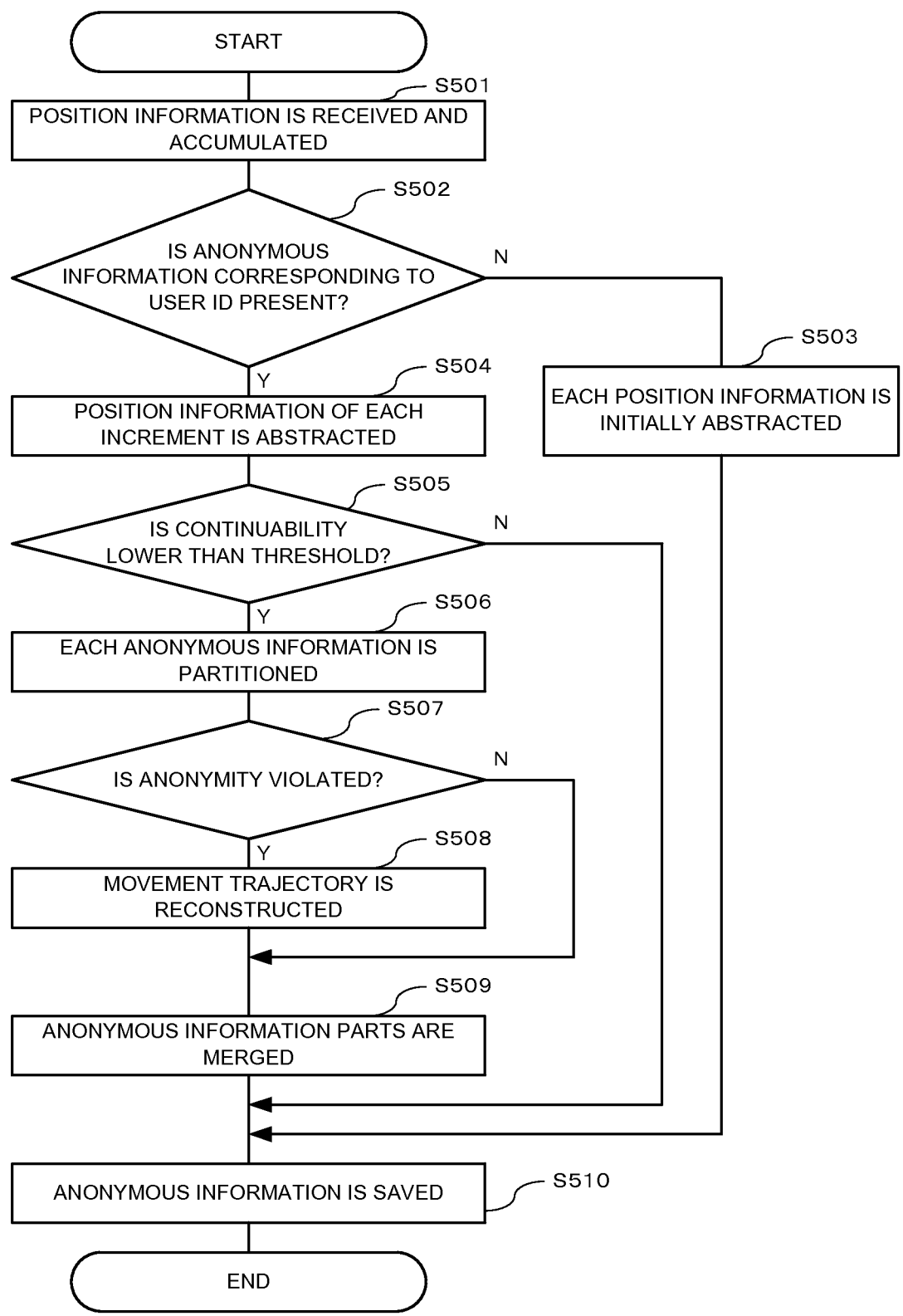
FIG. 5 is a flowchart illustrating an example of the anonymization processing in the first embodiment.

The anonymization processing in the information protection device 10 is explained below with reference to a specific example. FIG. 5 is a flowchart illustrating the anonymization processing in the first embodiment. FIGS. 6 to 9 illustrate examples of the generated anonymous information. In this case, it is assumed that the anonymity metric received by the anonymity metric receiving unit 38 is k=2 in k-anonymity.

The position information receiving unit 20 periodically receives the position information from a plurality of user terminals and accumulates the history of position information as movement trajectories in the movement trajectory storage unit 22 (S501). For example, the position information receiving unit 20 receives the position information on the user every other minute from each user terminal.

The increment abstraction unit 28 receives the position information periodically from the movement trajectory storage unit 22 and generates anonymous information by abstracting the positioning data of the position information. For example, the position information received every other minute by the position information receiving unit 20 is transferred via the movement trajectory storage unit 22 to the increment abstraction unit 28. Where the increment abstraction unit 28 receives the position information, the increment abstraction unit checks whether the anonymous information having the movement trajectory ID corresponding to each position information is present in the anonymous information storage unit 26 (S502). Whether or not the anonymous information is present may be also checked by the initial extraction unit 24.

Figure 6:
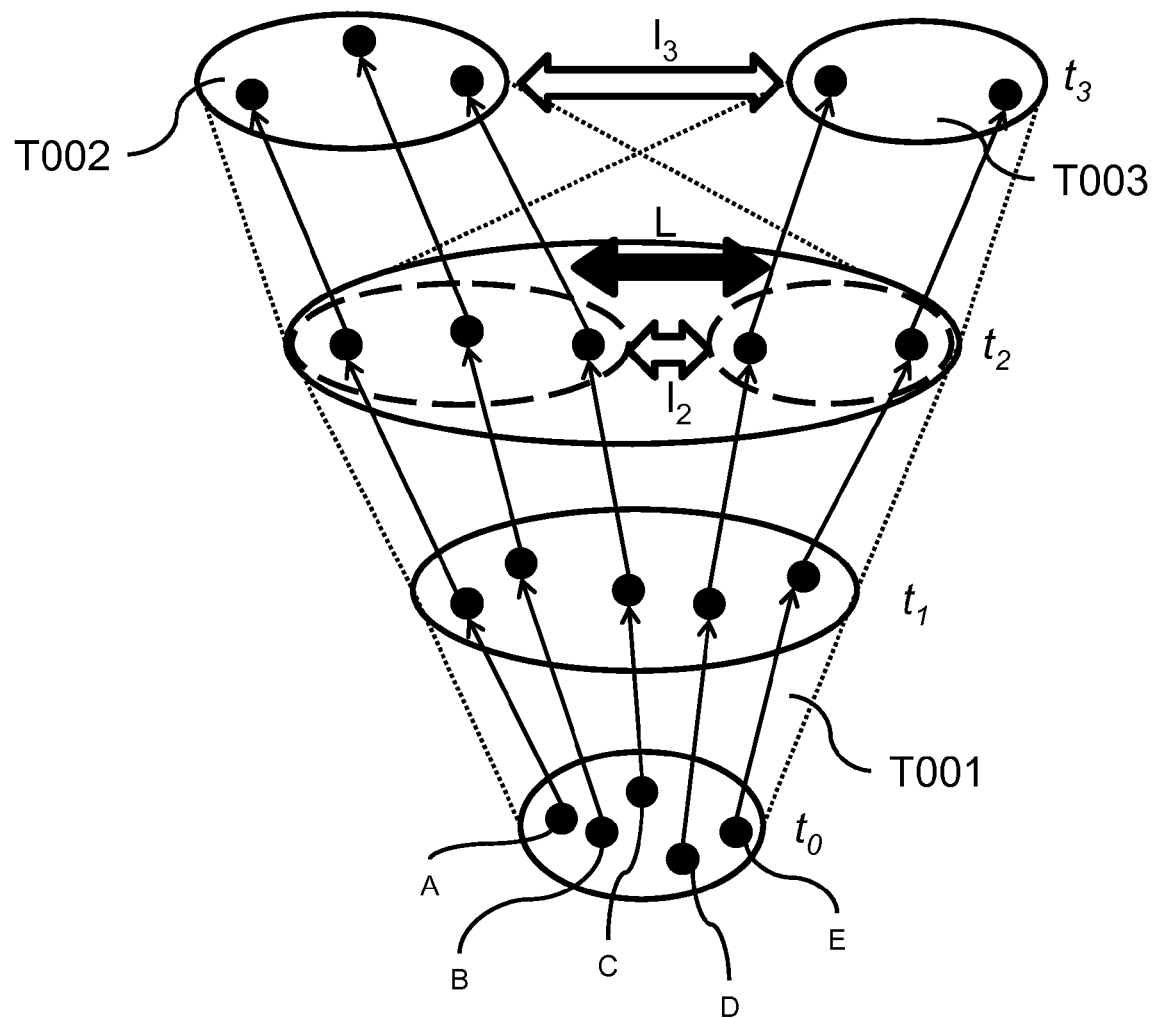
FIG. 6 illustrates an example in which the anonymous information is partitioned.

When the corresponding anonymous information is not present (S502: N), the initial extraction unit 24 performs grouping (clustering) of the position information with a close position indicated by the positioning data, so that each group (cluster) is configured by k or more position information parts, with respect to the position information with the same positioning time. In other words, the initial extraction unit 24 generates the anonymous information by grouping and abstracting the positioning data of position information on a plurality of users (S503). More specifically, the initial extraction unit 24 determines the area including the position indicated by the positioning data of position information in each group and generates anonymous information in which area information indicating this area has been set. The area enclosing the plurality of positions can be, for example, an ellipse with a minimal surface area that includes those positions. FIG. 6 shows an example in which the anonymous information is generated anew by grouping the position information on five users at the point of time t0. In the example shown in FIG. 6, the anonymous information ID "T001" is assigned to the anonymous information. Further, FIG. 9 shows an example of anonymous information stored in the anonymous information storage unit 26. Where the position information is thus abstracted, the users included in the area appear to have the same position information, and detailed position of the users cannot be identified.

Meanwhile, where the corresponding anonymous information is present (S502: Y), the increment abstraction unit 28 implements the abstraction of positioning data with respect to all position information having the movement trajectory ID same as the set of movement trajectories constituting the anonymous information (S504). The increment abstraction unit 28 then generates the anonymous information assigned with the anonymous information ID and movement trajectory ID same as those of the earlier generated anonymous information. For example, in the example shown in FIG. 6, the anonymous information is generated by grouping and abstracting the positioning data in the same group with the anonymous information at the point of time t0 with respect to the position information on the five users at the point of time t1.

Then, the continuability estimation unit 30 estimates the continuability with respect to the anonymous information generated by the increment abstraction unit 28 (S505). For example, when the area surface area is larger than a predetermined standard value, or when the density of anonymous information is lower than a predetermined standard value, it is determined that the continuability is less than a threshold. For example, in the example shown in FIG. 6, it is determined that the anonymous information at the point of time t1 satisfies the continuability.

When the continuability is less than the threshold (S505: Y), dynamic restructuring of the anonymous information is performed. In the present embodiment, the partitioning processing or merging processing is performed as the dynamic restructuring of the anonymous information.

The partitioning unit 32 partitions the anonymous information for which the continuability has become less than the threshold (S506). Well-known clustering method and classification method can be used for the partitioning processing, and various individual methods can be selected and used or a combination thereof can be used according to the circumstances. For example, the partitioning unit 32 can partition the anonymous information including 2k or more movement trajectories into two anonymous information parts. In this case, the anonymous information that could not be partitioned since the number of movement trajectories is less than 2k can be added as the candidate for subsequent merging processing to the list of candidates for merging. Further, the partitioning unit 32 can partition the anonymous information after considering whether or not the continuability has only temporarily become less than the threshold. For example, the partitioning unit 32 partitions the anonymous information when there is no overlapping between the two partitioned areas of anonymous information and the distance between the areas is equal to or greater than a threshold.

In this case, the distance between the areas can be taken, for example, as the distance between the closest points of the two areas or the distance between the central pointes of the two areas. Further, the distance between the areas may be an angle of transition from an area at a previous point of time to the two areas after the partitioning.

For example, for the anonymous information at the point of time t2 in FIG. 6, the area is wide and the continuability is less than the threshold. Therefore, the partitioning of the anonymous information into two groups shown by broken lines can be considered. In this case, the distance 12 between the areas of two groups is less than a predetermined threshold L and, therefore, the partitioning unit 32 does not perform the partitioning.

Further, for example, the partitioning performed similarly into two groups at the point of time t3 in FIG. 6 can be also considered. In this case, since the distance 13 between the areas of two groups is larger than the predetermined threshold L, the partitioning unit 32 generates two new anonymous information parts. Then, the partitioning unit 32 assigns "T002" and "T003" as anonymous information ID to the two anonymous information parts generated by the partitioning, as shown in FIG. 9, and sets "T001" as a parent anonymous information ID.

After the partitioning processing has been performed, the reconstruction unit 36 checks whether or not the anonymous information after the partitioning violates the k-anonymity (S507). Where the anonymous information violates the anonymity (S507: Y), the reconstruction of movement trajectories is performed (S508). As described hereinabove, such a reconstruction is necessary in the case in which the merged anonymous information is partitioned. A specific example of reconstruction is explained after the merging processing.

Then, the merging processing is executed by the merging unit 34 (S509). During the partitioning processing, the number of movement trajectories is less than 2k and the anonymous information that could not be partitioned is added as a candidate for merging processing to the list of candidates for merging. The merging unit 34 performs the merging of the anonymous information parts included in the list of candidates for merging, such that the continuability after the merging becomes higher than the average of the continuability of the two parts of anonymous information before the merging. More specifically, the merging unit 34 attempts the merging with respect to the anonymous information in the list of candidates for merging in the order from the anonymous information with a larger overlapping of the areas. The merging processing in the merging unit 34 is authorized where the continuability of the anonymous information after the merging is larger than the average of the continuability of the two parts of anonymous information before the merging. Otherwise, no merging is performed. This processing is performed with respect to the entire anonymous information in the list of candidates for merging. The merging unit 34 also assigns anew an anonymous information ID to the anonymous information after the merging and sets the anonymous information ID before the merging to the parent anonymous information ID.

Figure 7:
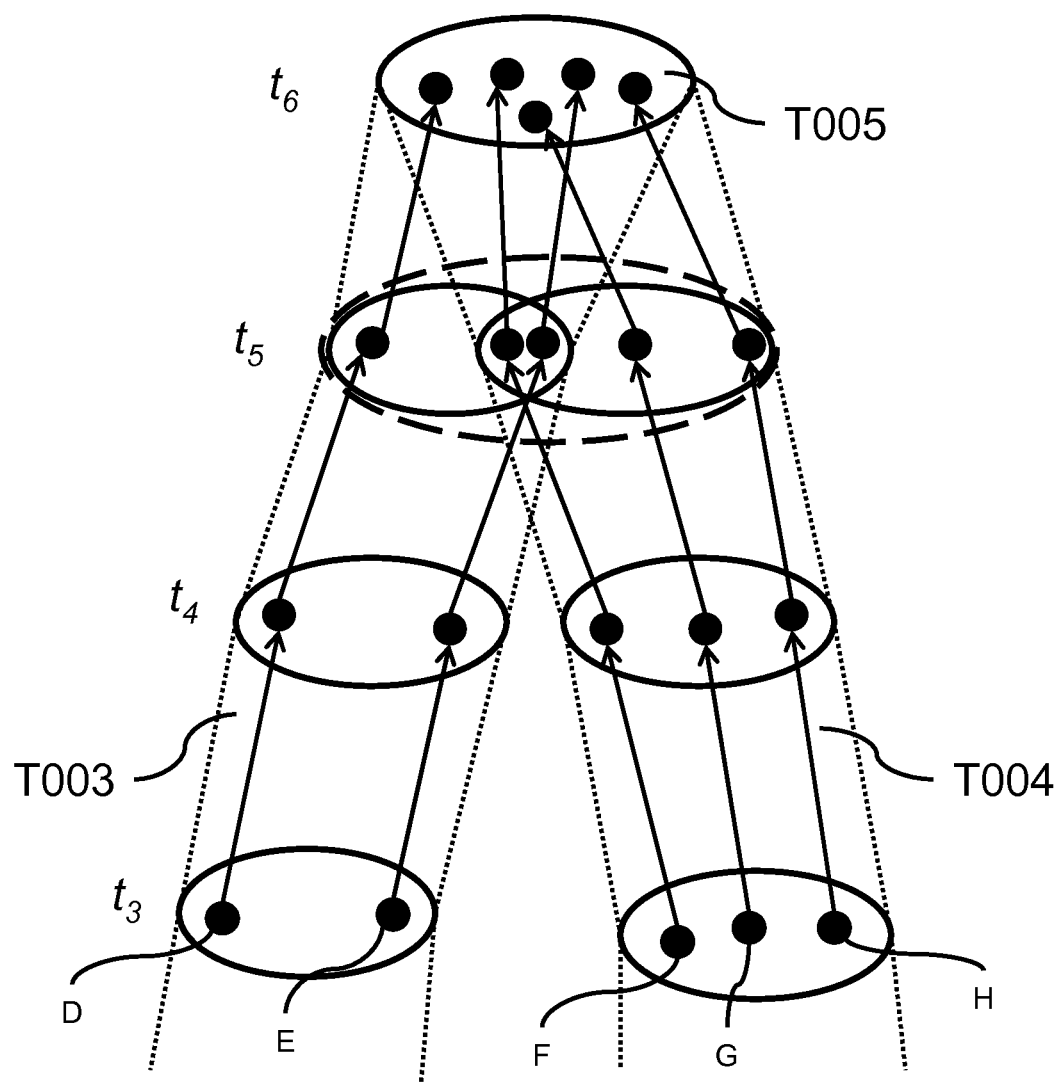
FIG. 7 illustrates an example in which the anonymous information is merged.

For example, it is assumed that at a point of time t5 in FIG. 7, two anonymous information parts with anonymous information ID "T003" and "T004" are included in the list of candidates for merging. In this case, the merging unit 34 determines whether or not the continuability improves when the two anonymous information parts are merged. In the example shown in FIG. 7, it is determined that the continuability is not improved and no merging is performed at the point of time t5. Meanwhile, at a point of time t6, the continuability is improved by merging the two anonymous information parts and, therefore, the merging unit 34 merges the two anonymous information parts and generates new anonymous information with the anonymous information ID "T005".

Figure 8:
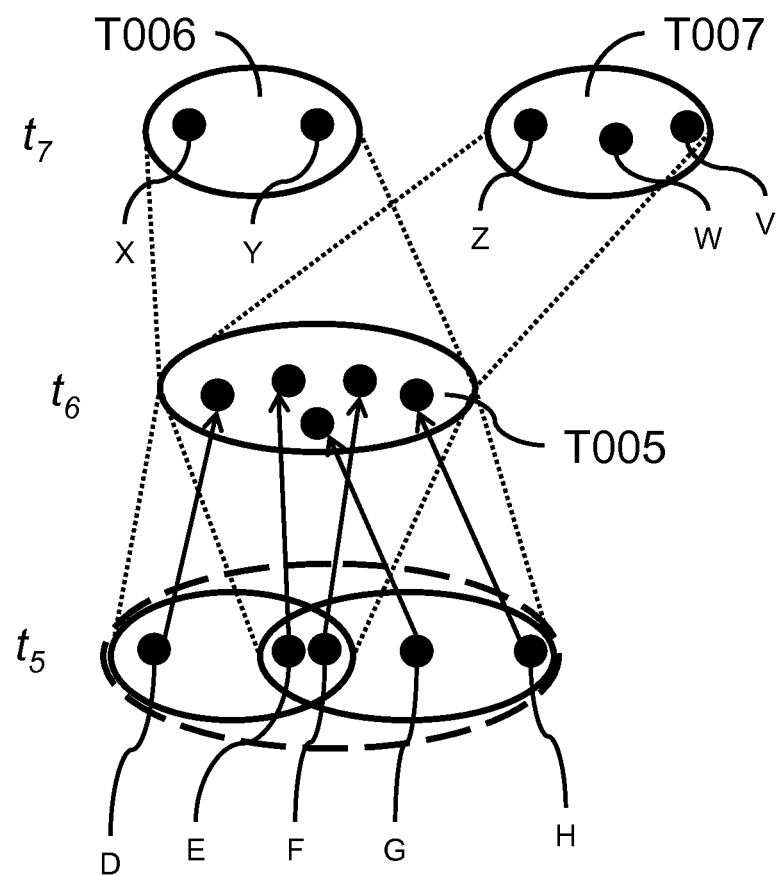
FIG. 8 illustrates an example in which the anonymous information is reconstructed.

FIG. 8 shows an example in which the anonymous information obtained by merging at the point of time t6 is partitioned again at a point of time t7. As shown in FIG. 8, at a point of time t7, two anonymous information parts with the anonymous information ID "T006" and "T007" are generated. At this time, the restructuring unit 36 estimates whether the movement trajectory preceding the point of time t7 violates the k-anonymity. Where this is the case, the restructuring unit 36 assigns a new movement trajectory ID to the anonymous information after the partitioning and initializes a parent anonymous information ID. Such restructuring processing maintains the k-anonymity, although the continuity of the movement trajectory is eliminated.

Finally, the anonymous information generated by the abstraction processing, partitioning processing, restructuring, and merging processing is stored in the anonymous information storage unit 26 (S510). As a result, as shown in FIG. 9, the anonymous information having set therein the parent-child relationship constituted by partitioning and merging is stored in the anonymous information storage unit 26. The anonymous information in which the parent-child relationship has been canceled by the restructuring is also stored in the anonymous information storage unit 26. The process of storing the anonymous information in the anonymous information storage unit 26 may be performed individually for each processing.

The anonymous information stored in the anonymous information storage unit 26 may be other than tubular information. For example, it may be the central point of anonymous information, coordinate values of the center of gravity, or coordinate values randomly sampled from the area. Further, it is also possible to store continuously the area of a certain fixed size starting from the center coordinates or coordinates of the center of gravity, instead of storing the original area of the anonymous information. Furthermore, the anonymous information which is to be stored may also include information other than the information obtained by anonymizing the position information actually measured from the user's terminal. The information obtained by adding noise to the center coordinates, coordinates of the center of gravity, or area may be also stored. In addition, it is possible not to store the anonymous information for all of the positioning timings, and the storage interval may be fixed or may change dynamically according to a variety of factors such as the load of the anonymization processing or the size of the data set.

Second Embodiment

The second embodiment of the present invention is explained below. The configuration of the information protection device 10 according to the second embodiment is the same as that of the first embodiment. However, the processing of generating the anonymous information in the initial abstraction unit 24 is different from that of the first embodiment. More specifically, in the second embodiment, the initial abstraction unit 24 generates the anonymous information such that the continuability increases.

For example, the initial abstraction unit 24 derives the initial degree of anonymity, when generating the anonymous information, with consideration for the density of position information of abstraction object when performing the initial abstraction. This initial degree of anonymity can be set high according to the density of position information. By increasing the initial degree of anonymity, it is possible to facilitate fine fractionation by partitioning to the corresponding degree and reduce the chance of losing information due to reconstruction (partitioning after merging) of the movement trajectory. Therefore, the anonymous information obtained by anonymization of the user movement trajectory can be provided as the information that is continuous over a long period of time.

Figure 10:
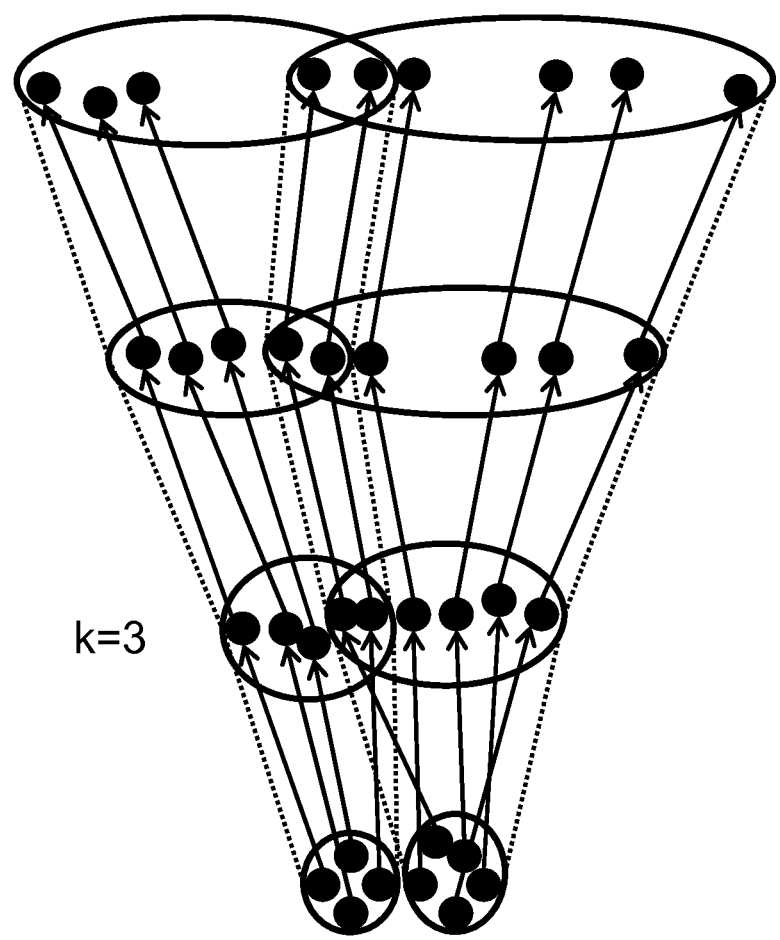
FIG. 10 illustrates an example of changes in anonymous information in the first embodiment.

FIG. 10 illustrates an example of anonymous information of a movement trajectory obtained by anonymization in the first embodiment performed so as to satisfy the k-anonymity (k=3). In the example shown in FIG. 10, when the anonymous information is initially formed, the positioning data of adjacent position information are grouped and abstracted in a minimal configuration within a range in which the k-anonymity is satisfied. Such minimal necessary anonymous information is formed when the partitioning processing is difficult to perform after a certain time has elapsed and the degree of abstraction cannot be inhibited before the merging processing is performed.

Figure 11:
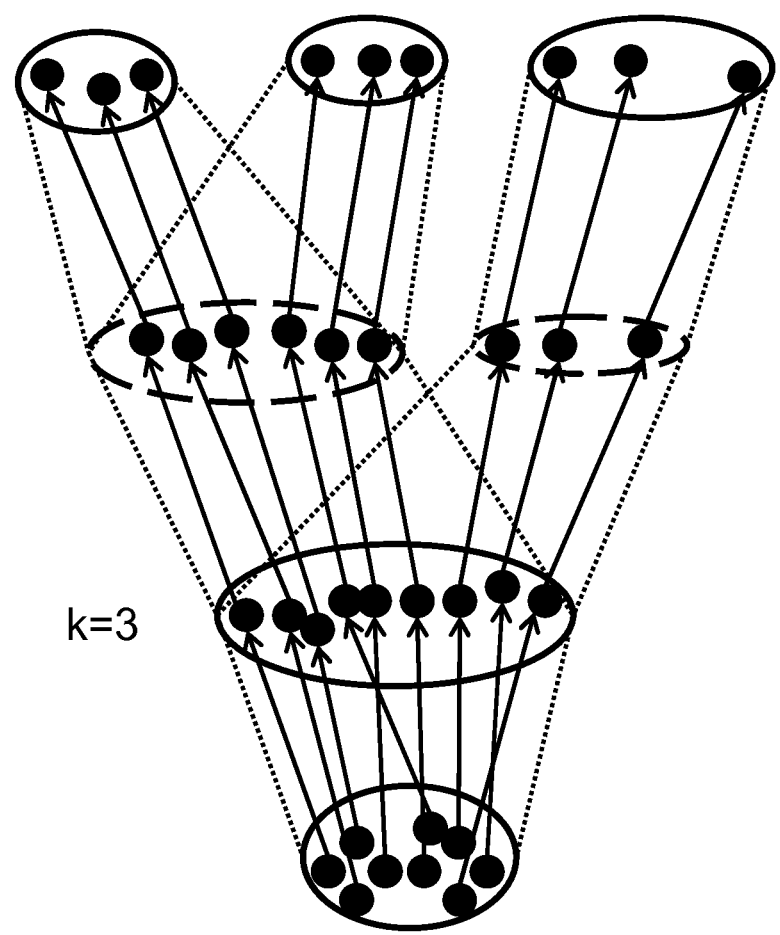
FIG. 11 illustrates an example of changes in anonymous information in the second embodiment.

Accordingly, in the second embodiment, the initial abstraction unit 24 sets a large number of position information parts constituting the anonymous information in the area with a high density of position information, as shown in FIG. 11. In other words, the initial abstraction unit 24 generates the anonymous information such as to satisfy the anonymity metric which is higher than the predetermined anonymity metric found with respect to the anonymous information. Thus, in the high-density area, although single anonymous information is constituted by a large number of position information parts, the degree of abstraction of the positioning data can be lowered. Further, the degree of freedom in configuring the anonymous information during the partitioning is high and the anonymous information with high continuability can be configured.

Figure 12:
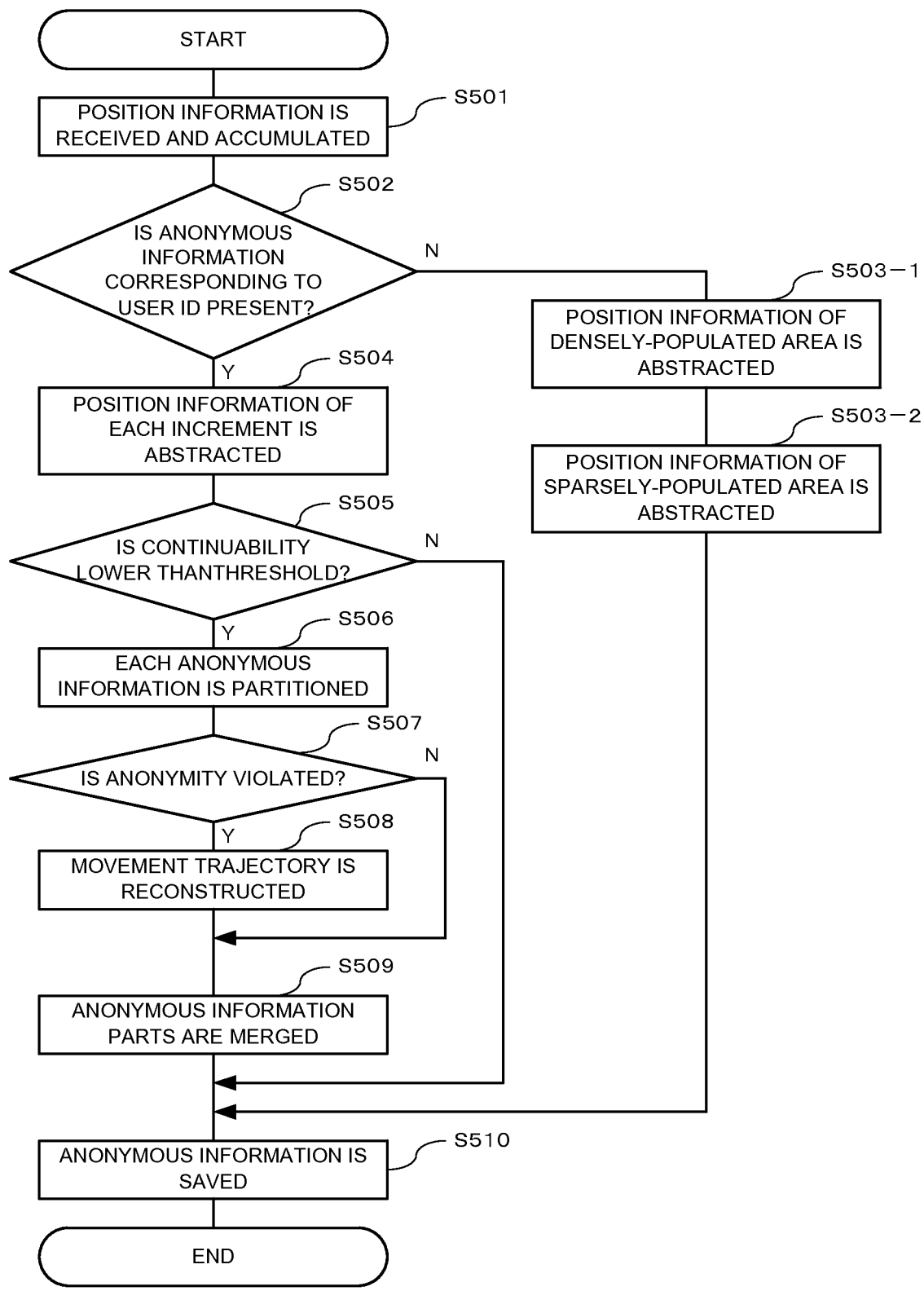
FIG. 12 is a flowchart illustrating an example of anonymization processing in the second embodiment.
Figure 15:
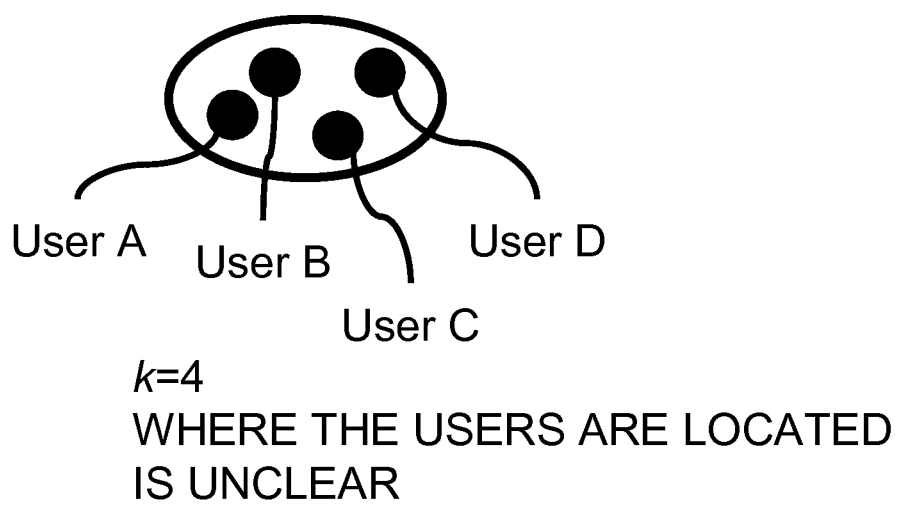
FIG. 15 shows an example of anonymization of position information.
Figure 16:
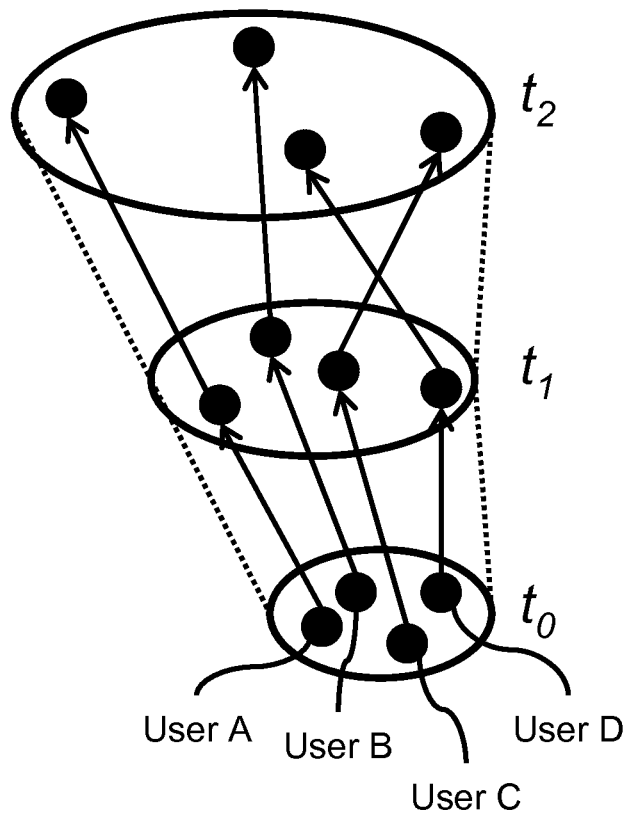
FIG. 16 shows an example of anonymization of movement trajectory.

FIG. 12 is a flowchart illustrating an example of anonymization processing in the second embodiment. The processing other than that performed by the initial abstraction unit 24 in the flowchart shown in FIG. 12 is the same as that shown in the flowchart in FIG. 5 of the first embodiment.

Only the processing performed in the initial abstraction unit 24, which is different from that of the first embodiment, is explained below.

The initial abstraction unit 24 performs the abstraction of the positioning data of each position information so that each position information satisfies the k-anonymity when the anonymous information corresponding to the user identifier of the position information extracted from the movement trajectory storage unit 22 is not present in the anonymous information storage unit 26 (S502: N). First, the initial abstraction unit 24 calculates the number Rnum of position information parts present inside a circle with a radius R centered on the position indicated by the positioning data of position information with respect to each position information. In this case, the entire set of position information is denoted by P. The initial abstraction unit 24 performs the following processing in the order of increasing Rnum with respect to the position information included in the P. The set of position information included in the circle with a radius R of the position information p∈P is denoted by Q. Where $|Q| \geq (k-1)$, the initial abstraction unit 24 performs the processing of P=P−Q−p and constitutes a cluster from p and Q (S503-1).

Then, the initial abstraction unit 24 performs the grouping such that the position information that does not form the cluster satisfies the k-anonymity. In this case, the initial abstraction unit 24 can perform the clustering till all of the clusters have a size equal to or greater than k by a clustering method, such as a simply-connected method or k-means, by taking the configured cluster and the position information that is not included in the cluster as the objects. Then, the initial abstraction unit 24 generates the anonymous information of each cluster that has eventually been formed and stores the generated anonymous information in the anonymous information storage unit 26 (S503-2).

The processing performed by the initial abstraction unit 24 is not limited to the above-described steps S503-1 and S503-2. For example, the following method may be also used. Thus, a position information group is partitioned by a density-based clustering method such as the k-means with respect to the entire position information. Where the cluster obtained by the partitioning includes k or more position information parts, the partitioning is continued, and where the cluster includes less than k position information parts, the partitioning is canceled. In this case, dense clusters can be generated in dense areas by ending the clustering process once the size of the cluster area has become equal to or less than a certain threshold, without performing the partitioning by clustering until the convergence.

The embodiments of the present invention are explained above. According to the embodiments, the anonymous information is partitioned so that the degree of abstraction of positioning data becomes lower than the predetermined standard value, and a parent-child relationship is set for the anonymous information before and after the partitioning. Therefore, when the position information is added in a real-time fashion, the anonymity of movement trajectories can be ensured and the degree of abstraction of the positioning data included in the position information can be prevented from becoming too high.

Further, in the embodiments, the partitioning processing is executed when the degree of abstraction of the positioning data is higher than the predetermined standard value. As a result, the unnecessary partitioning can be prevented and the continuability can be increased.

Further, in the embodiments, the partitioning processing is executed when the distance between the areas is greater than the predetermined threshold. In other words, the partitioning processing is performed when it is highly possible that two or more groups will move in different directions. In other words, even when the degree of abstraction of the positioning data is higher than the predetermined standard value, where the partitioned areas are close to each other, it is possible that the partitioned areas will again approach each other and, therefore, the partitioning processing is not performed. As a result, the number of partitioning cycles can be reduced and future continuability can be increased.

Further, in the embodiments, by merging two or more anonymous information parts for which the anonymity metric is not satisfied after the partitioning, it is possible to reduce the degree of anonymity of the positioning data below that before the merging.

Furthermore, in the embodiments, when the merged anonymous information parts are partitioned again and the movement trajectory does not satisfy the anonymity metric, the parent-child relationship before and after the partitioning is canceled. As a result, the anonymity of movement trajectories can be ensured.

Further, in the embodiments, the initial anonymous information can be generated such as to increase the continuability. Thus, the initial abstraction unit 24 generates the anonymous information by grouping the positioning data so that the number of positions indicated by the positioning data, which is included in a region of a predetermined size reaches a maximum. As a result, the continuability of the anonymous information generated by the anonymization can be increased.

Further, the embodiments are presented to facilitate the understanding of the present invention and are not intended to restrict the present invention. The present invention can be changed/modified, without departing from the essence thereof, and the present invention also includes the equivalents thereof.

For example, the embodiments describe an example in which the anonymous information generated by the initial abstraction unit 24 or the increment abstraction unit 28 is stored in the anonymous information storage unit 26, but the anonymous information generated outside the information protection device 10 may be also stored in the anonymous information storage unit 26. In other words, the increment abstraction unit 28 can add the anonymous information generated from the position information, which is added in a real-time fashion, to the anonymous information provided from the outside.

Further, for example, in the embodiments, it is assumed that the partitioning processing is performed when the continuability is less than the threshold, but the partitioning may be also performed so as to improve the continuability, regardless of whether the continuability is less than the threshold.

Further, in the embodiments, the size of the area in the anonymous information or the density of position information included in the area are presented as metrics for determining the degree of abstraction of positioning data, but the degree of abstraction of positioning data may be also determined with consideration for information other than the anonymous information. For example, the degree of abstraction of positioning data can be also determined with consideration for the properties of the area. More specifically, the degree of abstraction of positioning data can be also determined with consideration for the number of people staying in the area, the population density of the area, and the arrangement density of facilities present in the area. For example, in the area of the same size, the degree of abstraction can be determined to be higher as the arrangement density of facilities increases. This is because in the area with a high arrangement density of facilities the position information corresponding to a large number of facilities is abstracted in one area.

Further, in the embodiments, the continuability estimation unit 30 and the restructuring unit 36 are provided separately from the partitioning unit 32, but the continuability estimation unit 30 and the restructuring unit 36 may be also included in the partitioning unit 32.

The present application claims priority to Japan Patent Application No. 2010-290819 filed on Dec. 27, 2010, the entirety of which is incorporated herein.

The invention of the present application is explained above with reference to the embodiments thereof, but the invention of the present application is not limited to the abovementioned embodiments. The features and details of the invention of the present application can be changed variously in a way understandable to a person skilled in the art, without departing from the scope of the invention of the present application.

The entire embodiments or parts thereof can be also described as in the appendixes below, but are not limited thereto.

(Appendix 1) An information protection device comprising: a movement trajectory storage unit configured to store movement trajectories which are history of position information including a user identifier, positioning data indicating a position of a user, and positioning time; an anonymous information storage unit configured to store positioning data obtained by grouping and abstracting positioning data of position information on a plurality of users so that position information with the same positioning time satisfies a predetermined anonymity metric, the positioning data being stored as anonymous information in association with identifiers of movement trajectories of the plurality of users and the positioning time; an increment abstraction unit configured to refer to the movement trajectory storage unit and, with respect to the position information on the plurality of users including the same positioning time after the positioning time of the anonymous information stored in the anonymous information storage unit, generate anonymous information by grouping and abstracting positioning data in the same group with the anonymous information stored in the anonymous information storage unit and store the generated anonymous information in the anonymous information storage unit in association with the anonymous information stored in the anonymous information storage unit; and a partitioning unit configured to partition a group of the anonymous information with a second positioning time preceding a first positioning time into two or more groups so that the anonymous information with the first positioning time satisfies the predetermined anonymity metric and so that a degree of abstraction of the abstracted positioning data in the anonymous information becomes lower than a predetermined standard value, generate anonymous information including positioning data with the first positioning time abstracted by the partitioned groups, and store the generated anonymous information in the anonymous information storage unit in association with the anonymous information with the second positioning time.

The information protection device according to Appendix 1, further comprising an initial abstraction unit configured to refer to the movement trajectory storage unit and, with respect to position information on a plurality of users with the same positioning time for which the anonymous information has not been stored in the anonymous information storage unit, initially generate anonymous information including identifiers of movement trajectories of the plurality of users, positioning time, and abstracted positioning data by grouping and abstracting positioning data of position information on the plurality of users so as to satisfy the predetermined anonymity metric.

The information protection device according to Appendix 2, wherein the initial abstraction unit is configured to generate the anonymous information by grouping the positioning data so as to satisfy the predetermined anonymity metric and so that the number of positions indicated by positioning data included in a region of a predetermined size reaches a maximum.

The information protection device according to any one of Appendixes 1 to 3, wherein the partitioning unit is configured to partition the anonymous information with the first positioning time into the two or more groups when the degree of abstraction of the abstracted positioning data in the anonymous information with the first positioning time is higher than the predetermined standard value.

The information protection device according to any one of Appendixes 1 to 4, wherein the partitioning unit is configured to partition the anonymous information on condition that a distance between regions represented by positioning data abstracted by each group when partitioned is larger than a predetermined threshold.

The information protection device according to any one of Appendixes 1 to 5, further comprising a merging unit configured to generate anonymous information including positioning data with a fourth positioning time, which is after a third positioning time, the anonymous information with the fourth positioning time having been abstracted by a group obtained by merging two or more groups in anonymous information with the third positioning time, on condition that a degree of abstraction of positioning data abstracted by the merged group when the groups have been merged is lower than a degree of abstraction of positioning data abstracted by the groups prior to merging, and store the generated anonymous information in the anonymous information storage unit in association with the anonymous information with the third positioning time.

The information protection device according to Appendix 6, wherein when anonymous information with a fifth positioning time is associated with anonymous information with a sixth positioning time, which is earlier than the fifth positioning time, and a movement trajectory preceding the fifth positioning time does not satisfy the predetermined anonymity metric, the partitioning unit is configured to store the anonymous information with the fifth positioning time in the anonymous information storage unit, without associating this anonymous information with the anonymous information with the sixth positioning time.

The information protection device according to any one of Appendixes 1 to 7, further comprising an anonymity metric receiving unit configured to receive the predetermined anonymity metric.

The information protection device according to any one of Appendixes 1 to 8, further comprising a standard value receiving unit configured to receive the predetermined standard value.

An information protection method, comprising the steps of: storing movement trajectories which are history of position information including a user identifier, positioning data indicating a position of a user, and positioning time in a movement trajectory storage unit; referring to the movement trajectory storage unit, initially generating anonymous information including identifiers of movement trajectories of a plurality of users, positioning time, and abstracted positioning data by grouping and abstracting positioning data of position information on the plurality of users so that position information with the same positioning time satisfies a predetermined anonymity metric, and storing the generated anonymous information in an anonymous information storage unit; referring to the movement trajectory storage unit and, with respect to the position information on the plurality of users including the same positioning time after the positioning time of the anonymous information stored in the anonymous information storage unit, generating anonymous information by grouping and abstracting positioning data in the same group with the anonymous information stored in the anonymous information storage unit and storing the generated anonymous information in the anonymous information storage unit in association with the anonymous information stored in the anonymous information storage unit; and dividing a group of the anonymous information with a second positioning time preceding a first positioning time into two or more groups so that the anonymous information with the first positioning time satisfies the predetermined anonymity metric and so that a degree of abstraction of the abstracted positioning data in the anonymous information becomes lower than a predetermined standard value, generating anonymous information including positioning data with the first positioning time abstracted by the partitioned groups, and storing the generated anonymous information in the anonymous information storage unit in association with the anonymous information with the second positioning time.

A program for causing a computer to implement: a function of storing movement trajectories which are history of position information including a user identifier, positioning data indicating a position of a user, and positioning time in a movement trajectory storage unit; a function of storing positioning data obtained by grouping and abstracting positioning data of position information on a plurality of users, so that position information with the same positioning time satisfies a predetermined anonymity metric, as anonymous information in an anonymous information storage unit in association with identifiers of movement trajectories of the plurality of users and the positioning time; a function of referring to the movement trajectory storage unit and, with respect to the position information on the plurality of users including the same positioning time after the positioning time of the anonymous information stored in the anonymous information storage unit, generating anonymous information by grouping and abstracting positioning data in the same group with the anonymous information stored in the anonymous information storage unit and storing the generated anonymous information in the anonymous information storage unit in association with the anonymous information stored in the anonymous information storage unit; and a function of dividing a group of the anonymous information with a second positioning time preceding a first positioning time into two or more groups so that the anonymous information with the first positioning time satisfies the predetermined anonymity metric and so that a degree of abstraction of the abstracted positioning data in the anonymous information becomes lower than a predetermined standard value, generating anonymous information including positioning data with the first positioning time abstracted by the partitioned groups, and storing the generated anonymous information in the anonymous information storage unit in association with the anonymous information with the second positioning time.

10 information protection device
20 position information receiving unit
22 movement trajectory storage unit
24 initial abstraction unit
26 anonymous information storage unit
28 incremental abstraction unit
30 continuability estimation unit
32 partitioning unit
34 merging unit
36 reconstruction unit

I claim:

1. An information protection device comprising:
    a movement trajectory storage unit configured to store movement trajectories which are history of position information including a user identifier, positioning data indicating a position of a user, and positioning time;
    an anonymous information storage unit configured to store positioning data obtained by grouping and abstracting positioning data of position information on a plurality of users so that position information with the same positioning time satisfies a predetermined anonymity metric, the positioning data being stored as anonymous information in association with identifiers of movement trajectories of the plurality of users and the positioning time;
    an increment abstraction unit configured to refer to the movement trajectory storage unit and, with respect to the position information on the plurality of users including the same positioning time after the positioning time of the anonymous information stored in the anonymous information storage unit, generate anonymous information by grouping and abstracting positioning data in the same group with the anonymous information stored in the anonymous information storage unit and store the generated anonymous information in the anonymous information storage unit in association with the anonymous information stored in the anonymous information storage unit; and
    a partitioning unit configured to partition a group of the anonymous information with a second positioning time preceding a first positioning time into two or more groups so that the anonymous information with the first positioning time satisfies the predetermined anonymity metric and so that a degree of abstraction of the abstracted positioning data in the anonymous information becomes lower than a predetermined standard value, generate anonymous information including positioning data with the first positioning time abstracted by the partitioned groups, and store the generated anonymous information in the anonymous information storage unit in association with the anonymous information with the second positioning time.

2. The information protection device according to claim 1, further comprising
    an initial abstraction unit configured to refer to the movement trajectory storage unit and, with respect to position information on a plurality of users with the same positioning time for which the anonymous information has not been stored in the anonymous information storage unit, initially generate anonymous information including identifiers of movement trajectories of the plurality of users, positioning time, and abstracted positioning data by grouping and abstracting positioning data of position information on the plurality of users so as to satisfy the predetermined anonymity metric.

3. The information protection device according to claim 2, wherein the initial abstraction unit is configured to generate the anonymous information by grouping the positioning data so as to satisfy the predetermined anonymity metric and so that the number of positions indicated by positioning data included in a region of a predetermined size reaches a maximum.

4. The information protection device according to claim 1, wherein the partitioning unit is configured to partition the anonymous information with the first positioning time into the two or more groups when the degree of abstraction of the abstracted positioning data in the anonymous information with the first positioning time is higher than the predetermined standard value.

5. The information protection device according to claim 1, wherein the partitioning unit is configured to partition the anonymous information on condition that a distance between regions represented by positioning data abstracted by each group when partitioned is larger than a predetermined threshold.

6. The information protection device according to claim 1, further comprising a merging unit configured to generate anonymous information including positioning data with a fourth positioning time, which is after a third positioning time, the anonymous information with the fourth positioning time having been abstracted by a group obtained by merging two or more groups in anonymous information with the third positioning time, on condition that a degree of abstraction of positioning data abstracted by the merged group when the groups have been merged is lower than a degree of abstraction of positioning data abstracted by the groups prior to merging, and store the generated anonymous information in the anonymous information storage unit in association with the anonymous information with the third positioning time.

7. The information protection device according to claim 6, wherein when anonymous information with a fifth positioning time is associated with anonymous information with a sixth positioning time, which is earlier than the fifth positioning time, and a movement trajectory preceding the fifth positioning time does not satisfy the predetermined anonymity metric, the partitioning unit is configured to store the anonymous information with the fifth positioning time in the anonymous information storage unit, without associating this anonymous information with the anonymous information with the sixth positioning time.

8. The information protection device according to claim 1, further comprising an anonymity metric receiving unit configured to receive the predetermined anonymity metric.

9. The information protection device according to claim 1, further comprising a standard value receiving unit configured to receive the predetermined standard value.

10. An information protection method, comprising the steps of:
storing movement trajectories which are history of position information including a user identifier, positioning data indicating a position of a user, and positioning time in a movement trajectory storage unit;
referring to the movement trajectory storage unit, initially generating anonymous information including identifiers of movement trajectories of a plurality of users, positioning time, and abstracted positioning data by grouping and abstracting positioning data of position information on the plurality of users so that position information with the same positioning time satisfies a predetermined anonymity metric, and storing the generated anonymous information in an anonymous information storage unit;
referring to the movement trajectory storage unit and, with respect to the position information on the plurality of users including the same positioning time after the positioning time of the anonymous information stored in the anonymous information storage unit, generating anonymous information by grouping and abstracting positioning data in the same group with the anonymous information stored in the anonymous information storage unit and storing the generated anonymous information in the anonymous information storage unit in association with the anonymous information stored in the anonymous information storage unit; and
dividing a group of the anonymous information with a second positioning time preceding a first positioning time into two or more groups so that the anonymous information with the first positioning time satisfies the predetermined anonymity metric and so that a degree of abstraction of the abstracted positioning data in the anonymous information becomes lower than a predetermined standard value, generating anonymous information including positioning data with the first positioning time abstracted by the partitioned groups, and storing the generated anonymous information in the anonymous information storage unit in association with the anonymous information with the second positioning time.

11. A non-transitory computer-readable storage medium storing a program for causing a computer to implement:
a function of storing movement trajectories which are history of position information including a user identifier, positioning data indicating a position of a user, and positioning time in a movement trajectory storage unit;
a function of storing positioning data obtained by grouping and abstracting positioning data of position information on a plurality of users, so that position information with the same positioning time satisfies a predetermined anonymity metric, as anonymous information in an anonymous information storage unit in association with identifiers of movement trajectories of the plurality of users and the positioning time;
a function of referring to the movement trajectory storage unit and, with respect to the position information on the plurality of users including the same positioning time after the positioning time of the anonymous information stored in the anonymous information storage unit, generating anonymous information by grouping and abstracting positioning data in the same group with the anonymous information stored in the anonymous information storage unit and storing the generated anonymous information in the anonymous information storage unit in association with the anonymous information stored in the anonymous information storage unit; and
a function of dividing a group of the anonymous information with a second positioning time preceding a first positioning time into two or more groups so that the anonymous information with the first positioning time satisfies the predetermined anonymity metric and so that a degree of abstraction of the abstracted positioning data in the anonymous information becomes lower than a predetermined standard value, generating anonymous information including positioning data with the first positioning time abstracted by the partitioned groups, and storing the generated anonymous information in the anonymous information storage unit in association with the anonymous information with the second positioning time.

* * * * *